United States Patent [19]

van der Ploeg

[11] 3,918,869

[45] Nov. 11, 1975

[54] APPARATUS FOR AUTOMATICALLY FEEDING A NUMBER OF EXTRUDERS FROM A NUMBER OF SUPPLY CONTAINERS

[75] Inventor: Frederik van der Ploeg, Dalfsen, Netherlands

[73] Assignee: Wavin B.V., Zwolle, Netherlands

[22] Filed: Feb. 19, 1974

[21] Appl. No.: 443,848

[30] Foreign Application Priority Data

Feb. 20, 1973  Netherlands...................... 73/02359

[52] U.S. Cl................................. 425/190; 425/376
[51] Int. Cl.² .......................................... B29F 3/02
[58] Field of Search ........... 425/131, 132, 190, 192, 425/376

[56] References Cited
UNITED STATES PATENTS

| | | | |
|---|---|---|---|
| 2,115,246 | 4/1938 | Bainbridge...................... | 425/190 X |
| 3,193,878 | 7/1965 | Corbett........................... | 425/190 X |
| 3,371,139 | 2/1968 | Frazer............................. | 425/131 X |
| 3,433,261 | 3/1969 | Fox................................. | 425/190 X |
| 3,708,256 | 1/1973 | Kopp.............................. | 425/132 X |

*Primary Examiner*—R. Spencer Annear
*Attorney, Agent, or Firm*—Haseltine, Lake & Waters

[57] ABSTRACT

Apparatus for automatically feeding a number of extruders from a number of supply containers, wherein a supply nozzle for an extruder can be connected with a supply container, such that each supply container is connected with an individual supply container discharge nozzle and a supply container cut-off member, while each extruder is connected with an individual extruder supply nozzle. An automatic regulator is provided for controlling the members which connect an extruder supply nozzle with a supply container discharge nozzle and for opening the cut-off member of the supply container associated with the relating supply container discharge nozzle.

8 Claims, 4 Drawing Figures

APPARATUS FOR AUTOMATICALLY FEEDING A NUMBER OF EXTRUDERS FROM A NUMBER OF SUPPLY CONTAINERS

BACKGROUND OF THE INVENTION

This invention relates to a device for automatically feeding a number of extruders from a number of supply containers, while a supply nozzle for an extruder can be connected with a supply container.

In the plastics industry it is customary that a plurality of supply containers are available, filled with various compositions for manufacturing synthetic tubes, while each supply container can be connected with a particular extruder. To that aim an operator usually connects, by means of a hose, a particular extruder with the desired supply container. When a different composition should be fed to the extruder, another connection should be established. These are, however, complicated operations, on account of the large number of hoses to be used. Consequently errors are frequently committed causing an undesired or even useless product.

Another great disadvantage is the fact that such operations do not lend themselves to automation, as an extraordinarily large number of switch mechanisms would be required to establish the desired connection and to take the desired raw material from a particular supply container.

The plastics industry is, however, greatly interested in devices for automatically feeding a number of extruders from a number of supply containers without the intervention of manpower, such that the desired feed stock for a particular extruder is always available without any risk of mistakes and the like.

SUMMARY OF THE INVENTION

The invention seeks to overcome the disadvantages of the conventional devices. Each supply container is therefore connected with an individual supply container discharge nozzle and a supply container cut-off member, while the extruder is connected with an individual extruder supply nozzle and an automatic regulator is provided for controlling members serving to connect an extruder supply nozzle with a supply container discharge nozzle and opening the shut-off member of the supply container, associated with the relating supply container discharge nozzle. By using an automatic regulator for controlling members for connecting the extruder supply nozzle with the supply container discharge nozzle and opening the shut-off member of the supply container, associated with the relating supply container discharge nozzle, it becomes possible to take the desired feedstock from a particular supply container and to feed it to a particular extruder.

Although this apparatus offers many advantages with respect to the conventional devices, one may simplify the various members, which should cooperate with the automatic regulator, so as have discharge- and supply nozzles form an assembly, which assemblies can be moved with respect to each other by members, controlled by the automatic regulator, until a particular supply nozzle for an extruder registers and is connected with a particular supply container discharge nozzle.

A conveniently arranged apparatus is thus obtained, since both supply container discharge nozzles and extruder supply nozzles each constitute an assembly and the only operation to be performed is to move the extruder supply nozzle assembly and the supply container discharge nozzle assembly with respect to each other.

It has been found advisable to interconnect the extruder supply nozzles by a first plate and the supply container nozzles by a second plate, the latter extending parallel to the former, the first and second plates being movable with respect to each other until a desired supply container discharge nozzle registers with a particular extruder supply nozzle, whereupon these nozzles can be interconnected.

For connecting an extruder supply nozzle with a particular supply container discharge nozzle, the first and second plates can be moved toward and away from each other.

In a very advantageous manner, each end of an extruder supply line and/or supply container discharge line is provided with an end which in a longitudinal direction, is movably arranged with respect respectively to the extruder supply line and the, supply container discharge line, the end being supported by a spring which allows a movement in longitudinal direction. It is particularly advisable to provide the apparatus with an inlet for a washing agent to have at least the end of the extruder supply line blown clean after the supply container discharge nozzle has been closed. Thereby clean extruder supply nozzles are assured so that, on changing over from one feedstock to the other, no pollution occurs.

SURVEY OF THE DRAWINGS

FIG. 1 diagrammatically illustrates an apparatus with an assembly of extruder supply nozzles and supply container discharge nozzles, FIG. 2 shows another embodiment of the assembly of extruder supply nozzles and supply container discharge nozzles, FIG. 3 shows in section a detail of a connection between a supply container discharge nozzle and an extruder supply nozzle, and FIG. 4 shows another embodiment of a connection between the supply container discharge nozzle and the extruder supply nozzle.

DESCRIPTION OF PREFERRED EMBODIMENTS

Figure 1:
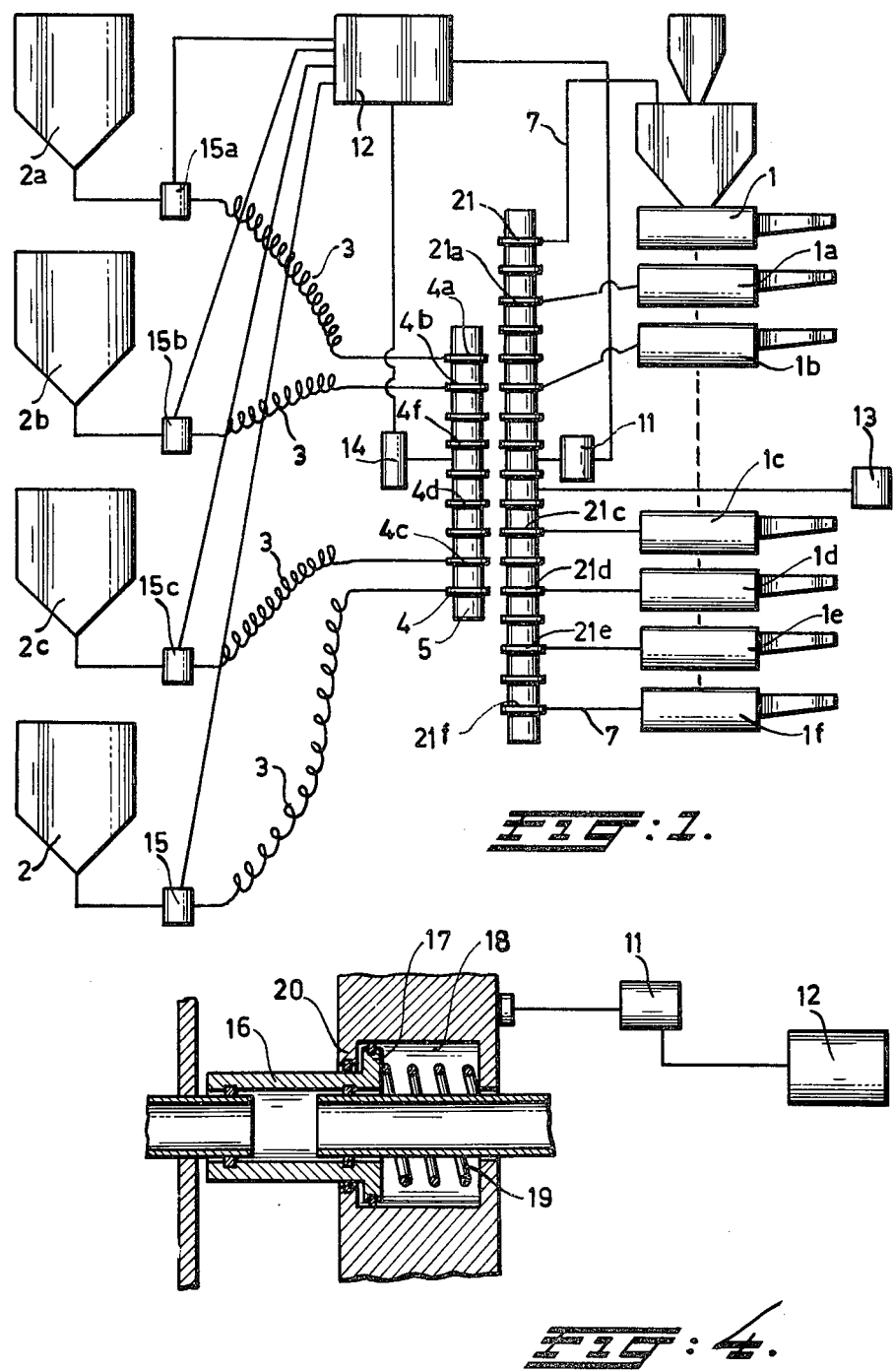
Figure 2:
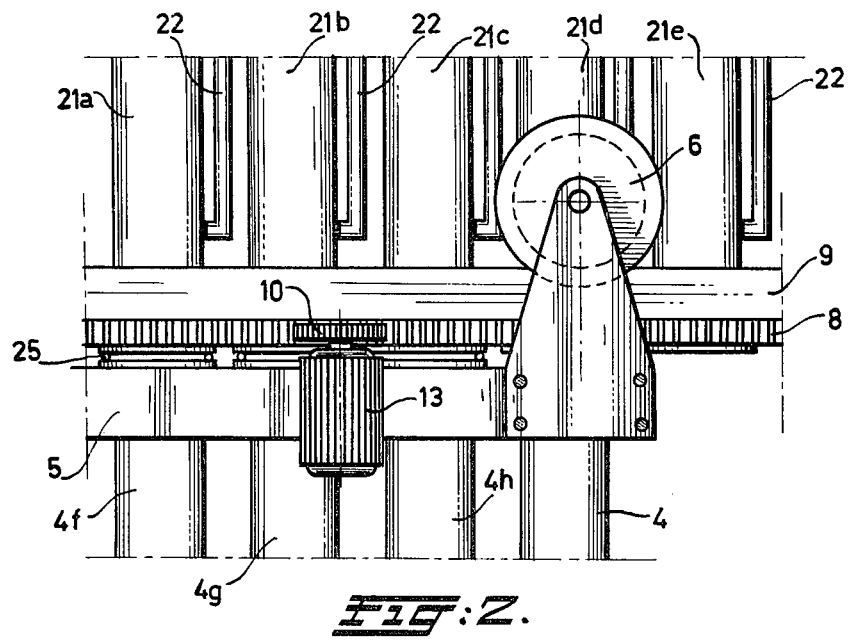
Figure 3:
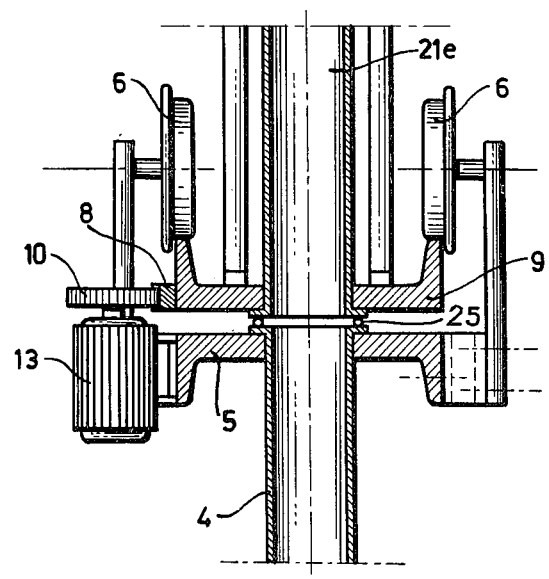

In FIG. 1 an apparatus is shown for automatically feeding a plurality of extruders 1, 1a, 1b, 1c, 1d, 1e, 1f. The apparatus also comprises a number of supply containers 2, 2a, 2b, and 2c. Each supply container is connected, via a flexible hose 3, with a supply container discharge nozzle. Thus, the supply container discharge nozzle 4a is connected with the supply container 2a, supply container 2b is connected with supply container discharge nozzle 4b, supply container 2c with supply container discharge nozzle 4c, etc.

The discharge nozzles are attached to an oblong plate 5 which can be shifted by means of a travelling wheel 6 which bears on a guide, with respect to a plate 9 which unites the extruder supply nozzles 21, 21a, 21b etc. This plate 9 is firmly secured.

Each extruder 1, 1a etc. is connected via a hose 7 connected with an extruder supply nozzle 21, 21a, 21b etc.. These extruder supply nozzles 21, 21a etc. are attached to stationary plate 9. For displacement of plate 5 with respect to plate 9, the latter carries a rack 8 which cooperates with a gear wheel 10 driven by a motor 13. When the extruder supply nozzles are in line with the supply container discharge nozzles, the plates 5 and 9 can be moved toward each other. For such movement of the plates with respect to each other, means known per se, such as gear wheel mechanisms or pneumatic means, can be used. In the present case, the pneumatic presser member 14 is used, which acts upon plate 5 to move the assembly of supply container discharge nozzles 4, 4a etc. towards plate 9 with the extruder supply nozzles 21, 21a etc.

The apparatus is further provided with an automatic regulator 12 in the form of a computer for, operating the pneumatic presser 14. The computer 12 is likewise connected to the motor 13 with gear wheel 10 which can move the plate 5.

It is obvious that in this apparatus the number of extruder supply nozzles 21, 21a etc. may be very large, as will be the number of supply container discharge nozzles 4, 4a, etc.

It is also obvious that the number need not be equal. In that case, however, a particular extruder supply nozzle should always cooperate with a supply container discharge nozzle.

After shifting plate 5 to the desired position with respect to plate 9, plates 5 and 9 are moved toward each other while the computer also regulates the opening of the supply container discharge valves or shut-off valves 15a, 15b, 15c etc.

In order to ensure a proper connection between the extruder supply nozzle 4a, 4b, etc. and the supply container discharge nozzle 21a, 21b, etc. rings 25 of an elastic material are employed which, on cooperation of plate 5 with plate 9, ensure a sealing between the extruder supply nozzles and the supply container discharge nozzles.

Instead of moving plate 5 toward plate 9, the extruder supply nozzles 21a, 21b can also be provided with end pipe pieces 16 with flanges 17 situated in recesses 18 of plate 9, the end pieces 16 being supported by springs 19 which are likewise accommodated in the recesses 18 of plate 9. In order to prevent the end pieces 16 from being pushed outwards, the recesses 18 are closed at their upper ends by edges 20 delimiting an opening with a diameter smaller than the diameter of the recess 18. The computer 12 in this case acts on pneumatic presser 11 to urge pipe pieces 16 into engagement with discharge nozzles 4.

It will be clear that in the apparatus, more plates 9 and/or more plates 5 may be used, so that more extruders can be fed simultaneously or that extruders are fed with feedstock from a particular supply container.

According to a special embodiment, plate 9 with the extruder supply nozzles is firmly secured since it is generally advisable to move this plate 9 in the least possible way, owing to the great number of extruders.

Instead of mounting the supply container discharge nozzles 4, 4a, 4b, 4c etc. on oblong plate 5, these nozzles can be efficiently disposed along the circumference of a circular plate, which can turn around its axis. In front of the plate, which carries along its circumference the supply container discharge nozzles 4, 4a etc., another plate 9 is then disposed which carries on its circumference the extruder supply nozzles 21, 21a. By turning plate 5 with respect to plate 9 and by moving these plates 5 and 9 toward each other, the desired connection can be established again.

One can obviously furnish computer 12 with particular memories, while special programs can be recorded, as in the course of time, certain extruders will be fed with a very particular previously determined feedstock.

The connection between the inlet of the extruder and the outlet of the supply container can, advantageously, be very small, so that, on changing over from one composition to the other, only a small risk of prolonged pollution due to previously applied mixture may occur.

To avoid the problem that, after having filled an extruder, synthetic material would be left in the extruder supply nozzle 21, 21a etc. Which later on when changing over to a different feedstock might cause a disturbance, the apparatus as described hereinbefore can be provided with a gas medium inlet 22 opening into the extruder discharge nozzles, whereby via these gas medium inlets 22, a gas can be introduced, when the discharge valve of the supply container has been closed, after filling the extruder. Thus, one can take care of the extruder supply nozzles 21a, 21b etc., always being blown clean after the extruder has been filled.

It is advisable to refrain from causing the plates 5 and 9 to move to and fro and develop another solution. The pneumatic presser 14 for example, can be caused to act upon the flange 17 of the end pieces 16, so that the end piece 16 can be moved toward or away from the opposite plate.

One can naturally also use lock members operated by the pneumatic presser 14, the lock members holding the spring 19 in the compressed position.

It is preferred to dispose the movable plate with the supply container discharge nozzles below the stationary plate 9 with the extruder supply nozzles 21, 21a, etc.

What I claim is:

1. Apparatus for selectively feeding plastic material from a plurality of supply containers to a plurality of extruders, said apparatus comprising a plurality of discharge nozzles, means connecting said discharge nozzles to the supply containers so that each container can supply a respective discharge nozzle with plastic material, a plurality of extruder supply nozzles, means connecting said supply nozzles to the extruders so that each extruder can be supplied with plastic material from a respective supply nozzle, a first plate supporting said supply nozzles as a first assembly, a second plate parallel to the first plate and supporting said discharge nozzles as a second assembly, valve means for controlling the flow of material between each supply container and its associated discharge nozzle, means for moving said plates relative to one another to selectively engage one discharge nozzle with an associated supply nozzle, and means for operating said valve means to allow the material to flow to said one discharge nozzle from the associated supply container.

2. Apparatus as claimed in claim 1 wherein said plates are movable towards and away from one another.

3. Apparatus as claimed in claim 1 comprising an elastic sealing ring associated with the nozzles of one of said plates for sealably engaging the nozzles.

4. Apparatus as claimed in claim 1 wherein the nozzles of one of said assemblies each include a tubular end piece slidably mounted in its associated plate, and spring means acting on said nozzles to hold the same in a biassed position in said plate.

5. Apparatus as claimed in claim 1 wherein said nozzles in each assembly are disposed in a circular arrangement along a circumference of the associated plate.

6. Apparatus as claimed in claim 1 comprising means for introducing a gas medium into said supply nozzles to clean the same.

7. Apparatus as claimed in claim 1 wherein said means for moving the plates relative to one another includes a support for one plate, and actuator means for moving the other plate in its own plane relative to the other plate.

8. Apparatus as claimed in claim 7 comprising power means for moving said plates towards and away from one another to engage the nozzles, said actuator means being constructed to accommodate such movement.

* * * * *